Nov. 4, 1952 W. W. SCHROCK 2,616,564
POTATO SEPARATOR
Filed July 11, 1947 2 SHEETS—SHEET 1
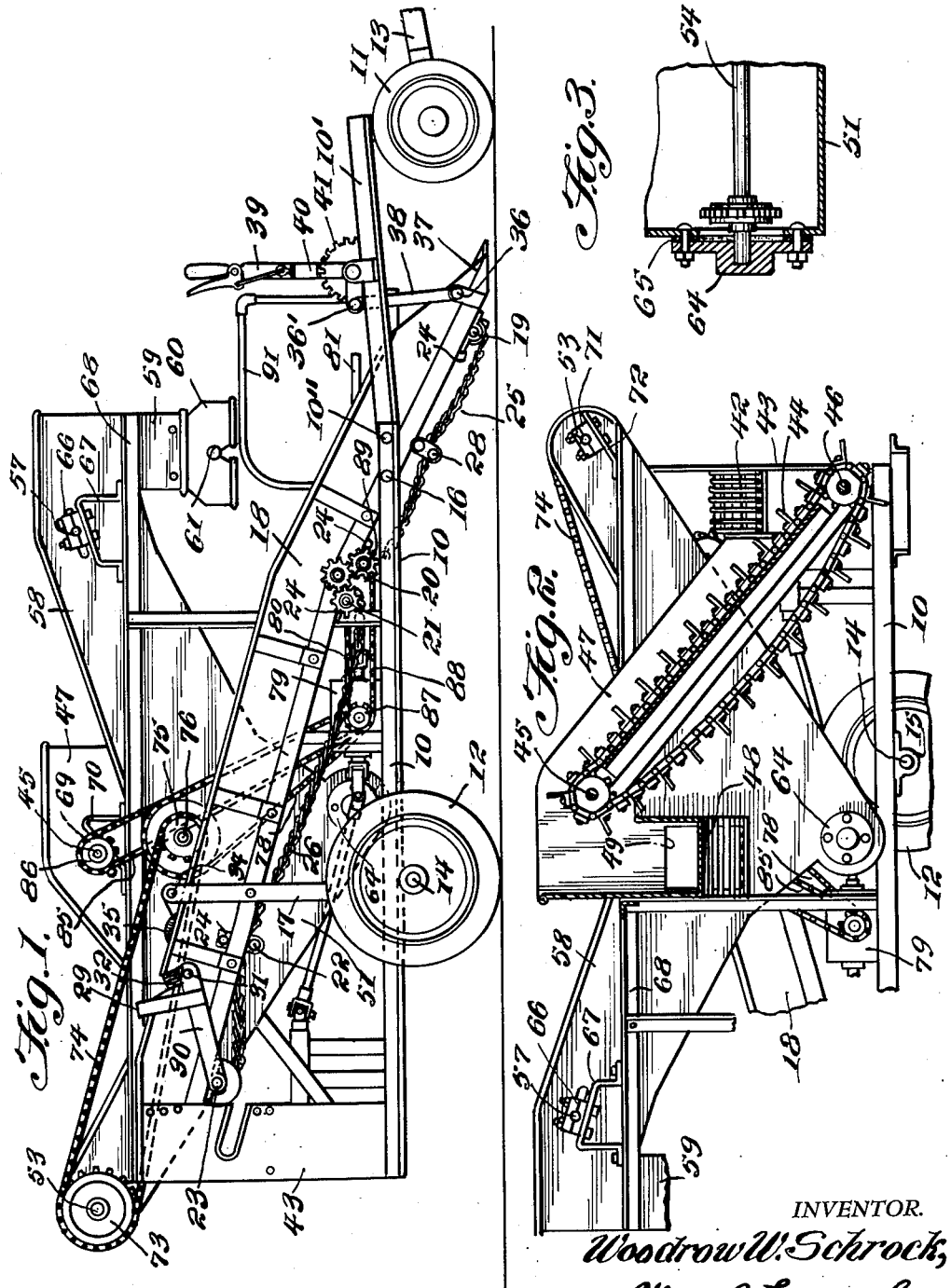
INVENTOR.
Woodrow W. Schrock,
BY Victor J. Evans & Co.
ATTORNEYS Nov. 4, 1952 — W. W. SCHROCK — 2,616,564
POTATO SEPARATOR
Filed July 11, 1947 — 2 SHEETS—SHEET 2
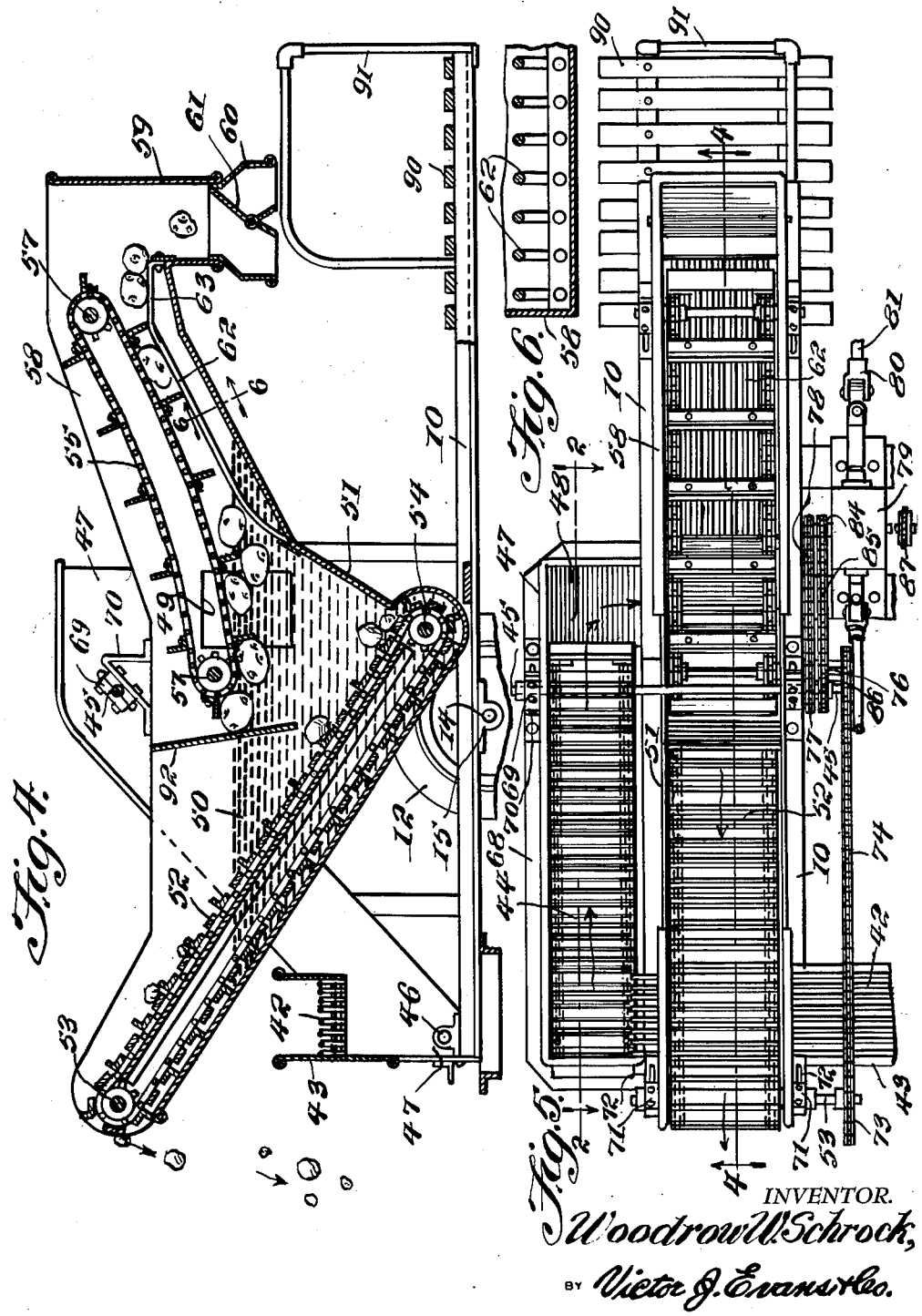
INVENTOR.
Woodrow W. Schrock,
BY Victor J. Evans & Co.
ATTORNEYS Patented Nov. 4, 1952

2,616,564

UNITED STATES PATENT OFFICE 2,616,564

POTATO SEPARATOR

Woodrow W. Schrock, Indiana, Pa.

Application July 11, 1947, Serial No. 760,267

1 Claim. (Cl. 209—173)

This invention relates to a potato harvester, which is designed to dig, pick, clean and separate the rocks from the potatoes, by specific gravity, and then sack the potatoes.

An object of the invention is to provide a potato harvester comprising a tank filled with a brine solution, and means for digging and delivering the potatoes to the tank, and means for delivering the potatoes from the tank to a sacking chute to sack the potatoes.

With the above and other objects and advantages in view, the invention consists of the novel details of construction, arrangement and combination of parts more fully hereinafter described, claimed and illustrated in the accompanying drawings in which:

Figure 1 is a side elevational view of a machine embodying the invention;

Figure 2 is a sectional view on the line 2—2 of Figure 5 on a reduced scale;

Figure 3 is a sectional view on the line 3—3 of Figure 2;

Figure 4 is a sectional view on the line 4—4 of Figure 5;

Figure 5 is a top plan view partly broken away of the machine and

Figure 6 is a sectional view on the line 6—6 of Figure 4.

Referring more in detail to the drawings, the reference numeral 10 designates a suitable elongated frame, which has the forwardly extending portion or extension 10' pivoted thereto at 10''. The frame and extension are mounted on front wheels 11 carried by the extension 10' and on rear wheels 12 carried by the frame 10. The axle of the front wheels is provided with a tongue 13, while the axle 14 of the rear wheels 12 is journalled in suitable bearings 15 secured to the under-surface of the frame 10.

Secured to the frame 10 by suitable fastening means 16, at the front end thereof, and to the frame 10 by uprights 17, is the conveyor chute 18, having axles 19, 20, 21 and 23 journalled transversely thereof in suitable bearings 24 on which are mounted the chain conveyors 25 and 26 respectively. The conveyors 25 and 26 are provided with guide bearings 22 and 28 respectively on each side of the chute 18, while a U-shaped bracket 29 carries the arms 30 which are mounted on the axle 23. The forward ends of the arms 30 carry the axle 31 on which are mounted a cleaning brush 32. The uprights 17 also carry an axle 34 at their upper ends, on which is mounted the cleaning brush 35. The forward end of the chute 18 has mounted thereon, the potato digger 37, the elevation of which is controlled by the linkage 38 pivoted to the frame 18 at 36, and at 36' is pivoted to the handle 39. The handle 39 is provided with a hand grip controlled dog 40 which engages the rack 41 fixed on the extension 10'. The potatoes from the conveyors 25 and 26 fall onto the inclined spaced rods 42 mounted in the housing 43 at the rear of the frame 10. Leaving the rods 43, the potatoes fall onto the link conveyor 44 carried by the axles 45 and 46 respectively journalled transversely of the housing 47. The conveyor 44 deposits the potatoes on the platform 48 and the potatoes leave the platform 48 through the opening 49 to fall into the brine solution 50 in the V-shaped bottom tank 51 mounted on the frame 10.

The rocks collected with the potatoes being of a heavier specific gravity than the brine, fall onto the link conveyor 52 mounted within the tank 51 on the axles 53 and 54 which are journalled transversely of the tank 51. The rocks are discharged from the end of the conveyor 52 onto the ground at the rear of the machine.

The potatoes being of lighter specific gravity than the brine solution, rise to the top thereof to be collected by means of the link conveyor 55 mounted on axles 56 and 57 journalled transversely of the tank 51, and the chute 58 formed on the tank which communicates with the depending chute 59 having the bagger nozzle 60 controlled by the valve 61 secured to the lower end thereof.

As the potatoes are carried upwardly by the conveyor 55, they pass over the parallel spaced rods 62 secured to the chute 58. The potatoes are then cleaned of a considerable amount of brine solution before they fall on the platform 63 formed by the upper end of the rods 62. The potatoes hesitate here before dropping into the bagger for further drainage, the following potato pushing them from the platform 63.

The bearings 64 of the axle 54 are provided with a gasket 65 to provide a liquid seal to prevent leakage of the brine from the tank 51. The axle 57 is provided with movable bearings 66 mounted on brackets 67 secured to the angle iron 68, which are secured to the tank 51 and chute 58. The axle 45 has movable bearings 69 mounted on brackets 70, likewise secured to the angle iron 68. The axle 53 is journalled in the bearings 71 secured to the bracket 72 secured to the angle irons 68, and one end is provided with a sprocket 73 having chain drive connection 74 with the sprocket 75 on the axle 76. A sprocket 77 on the axle 76 has a chain drive connection 78 with the power take-off 79 which, by the universal joint 80, is connected by a shaft 81 to the power take-off of a tractor, not shown. A power take-off sprocket 84 is connected by the chain drive 85 with the sprocket 86 on the axle 45, while the power take-off sprocket 87 is connected by a chain drive 88 with a sprocket 89 on the axle 20.

Below the bagger 60, a platform 90 is mounted on the frame 10, and is provided with a railing 91 for the safety of the person sacking the potatoes.

In operation, the potatoes are dug by the digger 37, and elevated by the conveyors 25 and 26 where most of the dirt, small rocks and debris are sifted out. The potatoes pass through the brushes 32 and 33, where the vines and potatoes are separated. Upon reaching the end of the last conveyor, the vines, potatoes and larger rocks will roll down the inclined rods 42, where the vines will be separated from the potatoes by means not shown. The potatoes and rocks will then be elevated by the conveyor 44 to the platform 48, from whence through opening 49 the potatoes and rocks will fall into the brine solution 50 in the tank 51. The rocks fall to the bottom of the tank to be discharged therefrom by means of the conveyors 52 onto the ground, while the potatoes will float and move over the rocks 62 by the conveyor 55 to be discharged into the chute 59 and then into the bagger 60. The operator standing on the platform 90 can then set the full sacks out on the ground at the side of the machine.

The tank 51 will be provided with a drain to remove soil or other debris carried therein by the potatoes, or the removal of the brine solution as desired. Forwardly of the lower end of the conveyor 55, a vertical slightly inclined baffle 92 prevents surging of the brine solution, and also tends to keep the potatoes within reach of the conveyor 55.

The machine thus described will efficiently dig, clean and sack the potatoes, and it has been found that the wetting of the potatoes by the brine solution will not prove detrimental to the potato.

It is believed that from the foregoing description, the structure and operation of the machine will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A harvester of the type described comprising an open top triangular shaped tank containing brine, a pair of transversely extending axles mounted at the apex of the tank and at one upper corner of the tank, a link conveyor mounted on said axles and extending along one side of the tank in parallel relation to that side of the tank and partially submerged in the brine, a second pair of transversely extending axles mounted at the opposite upper corner of the tank and adjacent the open top of the tank in overlapping relation to the axle mounted at the apex of the tank, a second link conveyor extending in the opposite direction from said first conveyor and mounted on the second pair of axles with one end thereof in overlapping relation with one end of the first conveyor and in contact with the brine in the tank, a depending chute on the tank at the end of the second conveyor removed from the end in contact with the brine, parallel spaced rods below and slightly spaced from said second conveyor, a platform at one end of the parallel spaced rods above the level of the brine and terminating adjacent said chute, whereby when potatoes and debris are placed in said tank said debris will be removed from the brine by said first conveyor at one end of the tank and the potatoes will be removed from the brine by said second conveyor at the opposite end of the tank to be delivered from said tank through said chute.

WOODROW W. SCHROCK.

REFERENCES CITED

The following references are of record in the file of this patent:

UNITED STATES PATENTS

| Number | Name | Date |
|---|---|---|
| 968,772 | Koressel | Aug. 30, 1910 |
| 1,447,912 | Travis | Mar. 6, 1923 |
| 1,483,024 | Travis | Feb. 5, 1924 |
| 1,935,908 | Johnson | Nov. 21, 1933 |
| 2,027,840 | Rodin | Jan. 14, 1936 |
| 2,414,721 | Cooper | Jan. 21, 1947 |
| 2,426,398 | Lathrop | Aug. 26, 1947 |

FOREIGN PATENTS

| Number | Country | Date |
|---|---|---|
| 48,934 | Netherlands | Feb. 15, 1940 |